March 10, 1959 H. MENTER 2,876,693
PERCOLATOR AERATION DEVICE
Filed Sept. 3, 1957

United States Patent Office 2,876,693
Patented Mar. 10, 1959

2,876,693

PERCOLATOR AERATION DEVICE

Henry Menter, Rochester, N. Y.

Application September 3, 1957, Serial No. 681,827

2 Claims. (Cl. 99—312)

This invention relates to a percolator, such as a coffee percolator, although the invention may be employed also in percolating or extracting devices other than coffee percolators.

An object of the invention is the provision of a generally improved and more satisfactory coffee percolator for general household use or for commercial use.

Another object is the provision of a simple, inexpensive, and rugged attachment which may be applied easily and quickly to many different kinds, styles, and sizes of percolators, to improve the quality and reduce the cost of the coffee made thereby.

A further object is the provision of a simple and inexpensive device which will aerate the water used in making coffee and will improve the flavor of the coffee both by reason of such aeration and by eliminating the bitter taste often found in percolated coffee.

A still further object is the provision of a combined water aerating device and temperature reducing device in a simple form useful in various kinds of extracting or percolating equipment.

These and other desirable objects may be attained in the manner disclosed as an illustrative embodiment of the invention in the following description and in the accompanying drawings forming a part hereof, in which Fig. 1 is a side elevation with parts broken away and parts in vertical section, showing a conventional coffee percolator with one form of the present invention applied thereto;

The same reference numerals throughout the several views indicate the same parts.

Figure 1:
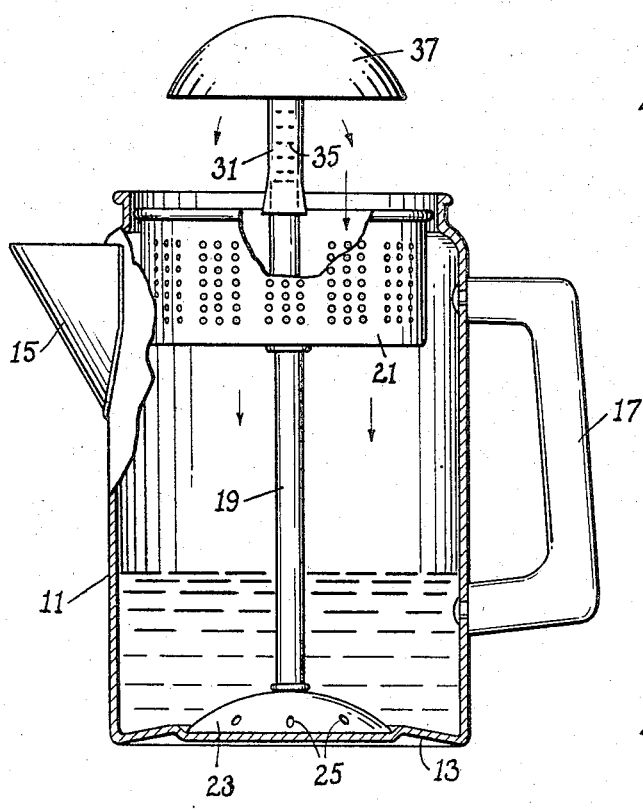

Referring first to Fig. 1 of the drawings, a preferred form of the present invention for use with a domestic or household percolator is shown in connection with a conventional percolator of the stove-heated kind (although it may be used equally well with one of the electrically-heated kind) comprising a pot indicated in general at 11, having a bottom 13, a spout 15, and a handle 17. Removably placed within this pot is the usual upright tubular stem 19 supporting the usual perforated coffee basket 21. Fixed to the bottom of the stem 19 is the usual slightly domed member 23 which covers a part of the area of the bottom 13 of the pot, and which has the usual holes 25 to permit replenishment of the water entrapped within the member 23 and forced upwardly through the tube 19 by the boiling action. The parts thus far described (except the handle 17) are usually made of sheet metal, conveniently aluminum. The pot is provided with the usual top or lid (not shown) which may be either hinged to the pot or unconnected to it, whichever is preferred.

It has been discovered that the bitter flavor or taste sometimes present in coffee is largely avoided if the water in contact with the ground coffee beans is slightly below boiling temperature, rather than at boiling temperature. This appears to be due to the fact that water at boiling temperature extracts or releases from the coffee beans certain essential oils which have a bitter taste. If the water is slightly under boiling temperature, however, it is hot enough to extract those essences which give coffee its characteristic body and flavor, yet not hot enough to extract the bitter components. But this is difficult to control in conventional percolators because the heat of the boiling water rising in the tube cannot be dissipated quickly enough to lower its temperature appreciably under the boiling temperature, especially when undergoing rapid percolation.

It has also been discovered that the flavor and general pleasantness of coffee are improved if the water is aerated. The boiling action of the water, while necessary in a percolator, obviously tends to expel even what little air was previously present in the water. The present invention provides for aeration of the water, to replace the air driven out by the boiling action or even to add more than the original normal amount of air dissolved in unboiled water, and also provides for slight cooling of the water below the boiling point, before the water comes into contact with the ground coffee beans, thus eliminating the bitter taste.

Figures 2, 5:
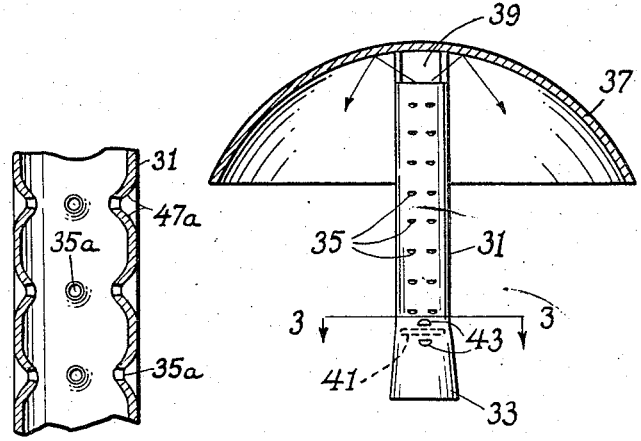
Fig. 2 is a detail view on a larger scale of the attachment in accordance with one embodiment of the present invention, partly in side elevation and partly in vertical section.
Fig. 5 is a similar section illustrating a different and usually preferred form of aeration opening.

Referring now to Fig. 2, one embodiment of the present invention comprises an upright tube 31 having its lower end somewhat flared or tapered as at 33, and having above this flared part a considerable number of aeration holes or openings 35, preferably arranged in a plurality of vertical rows. A dome member 37, having a diameter slightly less than the diameter of the open top of the coffee pot 11 (conveniently about three-quarters of the diameter of the top) is fastened to the top of the tube 31. The dome member is imperforate, and is conveniently curved in the shape of a portion of a sphere, with its convex side uppermost. Just below the dome member, the sides of the tube 31 are cut away to form relatively large openings 39 for lateral discharge of water rising through the tube 31, leaving only a supporting spider of thin legs of metal between the openings 39, for attachment to and support of the dome 37. The tube 31 and dome 37 are preferably of metal having high heat conductance, such as aluminum.

Figure 3:
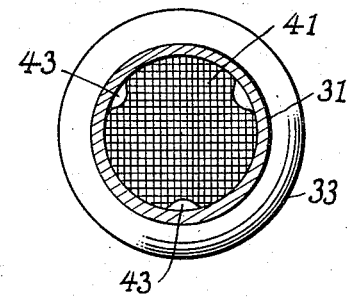
Fig. 3 is a horizontal section taken approximately on the line 3—3 of Fig. 2, on a larger scale.

Referring now to Fig. 3, there is preferably a fine mesh screen 41 extending across the tube 31 below the lowest holes 35 and just above the top of the flared part 33. The screen may be held in place by any suitable means, e. g., by ears or dents 43 pressed inwardly in the sides of the tube 31 above and below the screen. The screen breaks up the flow of water for more efficient aeration.

Figure 4:
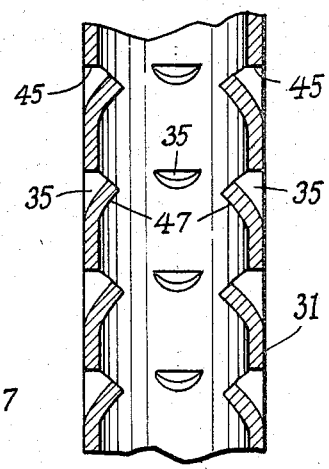
Fig. 4 is a fragmentary vertical section through one form of tube of the device, illustrating details of the formation of the aeration openings.

The aeration holes in the tube 31 may be simply punched or drilled straight through the side walls of the tube. However, a better form of hole is produced by making a small cut or slit 45 extending in a circumferential direction in the side wall of the tube 31 where each hole 35 is to be formed, as seen in Fig. 4, then bending or deforming the metal below each slit inwardly as indicated at 47. Thus the inwardly sloped part 47 deflects the upwardly flowing water inwarly, away from the hole 35, minimizing the chance of lateral escape of some of the water out through the hole and also producing to a slight degree a constriction of the diameter of the tube 31 in the vicinity of each hole, resulting in somewhat of a Venturi effect which helps to suck air in through the hole. It is found in practice that plain holes going straight through the side wall of the tube will produce some aerating effect, since air is actually sucked in through many of the holes, rather than water escaping out through them. But when the holes are formed as just described in connection with Fig. 4, a better and more pronounced aerating effect is produced.

A still better and more efficient form of aeration hole is shown in Fig. 5. Here, each hole 35a is formed at the bottom of a small dimple or crater or depression 47a pressed inwardly and having inwardly curving sides in all directions around each hole 35a, there being a multiplicity of such holes, as before. Just as in the form shown in Fig. 4, these holes in Fig. 5 provide a slight constriction or Venturi effect. In addition, the shape of the inner surface of the tube is such that the flowing water is deflected inwardly away from the hole regardless of the direction of flow. In the percolating action, the upward flow of water is usually in intermittent spurts, some of the water in the tube starting to flow downwardly again after each upward spurt. When the aeration openings are formed as in Fig. 5, the water is deflected away from the holes during its reverse or downward flow as well as during its upward flow, and there is practically no seepage of water out through the holes. In Fig. 4, however, when the water flows downwardly it is quite likely to leak out through the aeration openings to some extent. Therefore the form shown in Fig. 5 is usually more satisfactory.

In the use of the present invention, the top is taken off of the conventional percolator, and is left off (or, if hinged, is swung back to its fully open position) during the brewing of the coffee. The ground coffee beans are placed in the basket 21 in the usual manner, and the usual amount of water is placed in the pot 11. The usual perforated distributor plate (not shown) is placed across the top of the coffee basket. Then the tube 31 of the present invention is placed over the upper end of the stem of the coffee basket, thus supporting the dome 37 at some little elevation above the top of the percolator, as seen in Fig. 1.

Then heat is applied to the water in the pot, to boil the same. According to the familiar action, the boiling water flows up the tube 19. However, when the water reaches the top of this tube, it cannot escape laterally into the coffee basket while still at boiling temperature, as it does in the conventional percolator. Instead, it is confined and forced to travel up the extension tube 31, meanwhile sucking air in through the holes 35 and becoming aerated. At the top of the extension tube 31, the water issues laterally through the openings 39, which are sufficiently large to permit free outflow without creating back pressure. The laterally issuing water hits against the concave face of the dome 37 and is deflected downwardly onto the ground coffee in the basket 21, seeping through the ground coffee and dropping back into the pot. The action is continued as long as necessary, until coffee beverage of the required strength is produced.

Since the top of the pot is open at this time, with no confining cover or lid, the dome 37 is exposed to surrounding room temperature on its top surface, and remains considerably below the temperature of boiling water. Most of the water issuing from the holes 39 at the top of the tube or stem 31 comes in contact with the under or concave surface of the dome 37 before dropping down to the coffee basket. Thus the water, although at boiling temperature as it rises through the tube 31, gives up a substantial amount of heat to the dome 37, which dome, in turn, radiates the heat to the surrounding unconfined atmosphere. The aeration of the water also helps appreciably to cool it. The water is thus cooled both by radiation and by aeration before it reaches the coffee in the basket 21, with the result that the bitter oils or essences are not extracted from the coffee beans.

Figure 6:
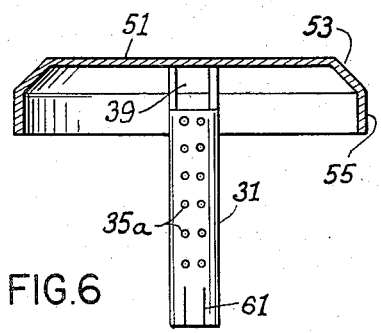
Fig. 6 is a view similar to Fig. 2, illustrating an alternative form of dome and tube.

The dome 37 shown in Figs. 1 and 2 is of spherical shape, as already mentioned. Equally good results may be attained by domes of other shapes, however. For instance, as seen in Fig. 6, the dome may have a flat top 51 surrounded by a downwardly sloped frusto-conical zone 53 terminating in a short cylindrical skirt or flange 55. So far as performance is concerned, there is little to choose between a dome of the spherical form 37 shown in Fig. 2 and one of the form 51, 53, 55 shown in Fig. 6. However, the latter can probably be manufactured more easily and at less expense, because the draw of the metal in Fig. 6 is not so deep as in Fig. 2.

The under or concave surface of the dome, whether of the form shown in Fig. 2 or the form shown in Fig. 6, may be smooth, and works very satisfactorily. However, the dome (whether of the general shapes illustrated or of other shapes) may be corrugated, fluted, ribbed, or finned, if desired, both for the purpose of increasing the surface area which comes in contact with the water, so that the water gives up its heat more readily to the dome, and for the purpose of increasing the area of the dome which radiates heat to the surrounding atmosphere, and for the purpose of producing more effective distribution of the water issuing from the tube and impinging on the under surface of the dome.

When the brewing or percolating of the coffee is completed to the required strength, the attachment 31, 37 may be removed from the pot, either separately or along with the coffee basket 21 and stem 19, and the lid or cover may then be placed on the coffee pot to keep the contents warm until used.

This invention enables the making of coffee more economically than with the conventional percolator, because the cooling of the water enables percolation to be continued longer than usual, without producing the bitterness usually resulting from long continued percolation. Because of the longer time of percolation, a smaller quantity of ground coffee beans is sufficient to produce a given strength and quantity of coffee beverage.

Also, if time is important, good coffee may be made more quickly with the present invention than with conventional percolators, because the percolating action may be speeded up by boiling the water more violently than with conventional percolators, yet without danger of imparting the bitter taste that would conventionally result from very violent boiling.

Although the present invention is preferably in the form of a separate attachment which may be used on various conventional percolators, it may be manufactured as an integral part of the percolator. For example, the tube 31 may be made integrally with or permanently attached to the central tubular stem of the coffee basket 21. In that case, of course, the distributor plate that fits over the basket assembly would have to be made in two pieces or be otherwise formed so that it may be removed to enable ground coffee to be placed in the basket and spent grounds to be removed therefrom.

When made as a separate attachment (which is the preferred form of the device) the flare or taper 33 at the lower end of the tube 31 enables it to fit snugly on basket stems of various different sizes, most of the commonly used percolators having basket stems of about the same diameter, with only minor variations. However, the lower end of the tube 31 can be cylindrical (see Fig. 6) rather than flared, to have a snug sliding fit on a basket assembly of given size, which snug sliding or telescoping fit is facilitated if the lower end portion of the tube 31 has two or three longitudinal slots 61 to make it slightly resilient.

While the present invention is particularly useful with ordinary household percolators, the construction may be adapted to large commercial percolators and to other commercial coffee making equipment. Indeed, it is not limited in its usefulness to coffee making equipment, but may be employed in any device or appliance for making beverages, foods, or liquid extracts, wherever the aeration of water may be desirable, or wherever some cooling of boiling water below its boiling temperature may be advantageous (especially when combined with a desire for aeration) in any extraction process or the like.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A coffee percolator for making percolated coffee beverage with aerated hot water at a temperature below the boiling point of water, said percolator comprising a pot for containing a supply of water to be boiled therein, said pot having an open top, a coffee basket within said pot near the top thereof for containing ground coffee beans, tubular stem means rising from a point near the bottom of said pot upwardly through said basket, means for causing water boiling within said pot to flow upwardly through said stem means, said stem means extending upwardly to an elevation substantially above the open top of the pot and above said coffee basket, a downwardly concave dome member of sheet metal having high heat conductance fastened to and supported by the upper end of said stem means in a position exposed to the surrounding atmosphere so that heat from said dome member may be radiated to the surrounding atmosphere, a water discharge opening substantially at the top of said stem means and beneath said dome member and positioned so that water rising through said stem means will be discharged from said opening mainly against the under side of said dome member, will be partially cooled by contact with said dome member, and will be deflected by said dome member to fall downwardly onto the ground coffee beans within said basket, and a multiplicity of aeration openings formed in side walls of said tubular stem means in the portion thereof above the top of said basket and below said dome member, through which air may be sucked into the upwardly flowing column of water to aerate it and to assist in cooling it.

2. A construction as defined in claim 1, in which a portion of the wall of said stem means is deflected inwardly just below each of said aeration openings, to deflect the upwardly flowing column of water away from each aeration opening and to provide a slight constriction in said stem means in the vicinity of each aeration opening, to enhance the action of sucking air through the aeration openings and into the flowing column of water.

References Cited in the file of this patent
UNITED STATES PATENTS

| | | |
|---|---|---|
| 240,976 | Dowling | May 3, 1881 |
| 783,525 | James | Feb. 28, 1905 |
| 868,187 | Ives | Oct. 15, 1907 |
| 879,096 | Gaunt | Feb. 11, 1908 |